(12) United States Patent
Stellmach et al.

(10) Patent No.: US 10,831,265 B2
(45) Date of Patent: Nov. 10, 2020

(54) SYSTEMS AND METHODS FOR GAZE-INFORMED TARGET MANIPULATION

(71) Applicant: Microsoft Technology Licensing, LLC, Redmond, WA (US)

(72) Inventors: Sophie Stellmach, Seattle, WA (US); Casey Leon Meekhof, Redmond, WA (US); Julia Schwarz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/958,686

(22) Filed: Apr. 20, 2018

(65) Prior Publication Data

US 2019/0324529 A1 Oct. 24, 2019

(51) Int. Cl.
*G06F 3/01* (2006.01)

(52) U.S. Cl.
CPC .............. *G06F 3/013* (2013.01); *G06F 3/017* (2013.01)

(58) Field of Classification Search
CPC .................................. G06F 3/013; G06F 3/017
See application file for complete search history.

(56) References Cited

U.S. PATENT DOCUMENTS

| | | |
|---|---|---|
| 9,823,764 B2 | 11/2017 | Schwesinger et al. |
| 2005/0243054 A1 | 11/2005 | Beymer et al. |
| 2012/0272179 A1 | 10/2012 | Stafford |
| 2013/0335405 A1 | 12/2013 | Scavezze et al. |
| 2014/0160001 A1 | 6/2014 | Kinnebrew et al. |
| 2014/0191946 A1* | 7/2014 | Cho ..................... G02B 27/017 345/156 |
| 2016/0048223 A1 | 2/2016 | Taguchi et al. |
| 2017/0060230 A1 | 3/2017 | Faaborg et al. |
| 2017/0123492 A1 | 5/2017 | Marggraff et al. |
| 2018/0088676 A1* | 3/2018 | Ach ........................ G06F 3/011 |
| 2018/0232064 A1 | 4/2018 | Vroom et al. |

(Continued)

FOREIGN PATENT DOCUMENTS

| | | |
|---|---|---|
| EP | 2525271 A2 | 11/2012 |
| WO | 2016205046 A1 | 12/2016 |
| WO | 2017039931 A1 | 3/2017 |

OTHER PUBLICATIONS

"International Search Report and Written Opinion Issued in PCT Patent Application No. PCT/US2019/031923", dated Jul. 19, 2019, 10 Pages.

(Continued)

*Primary Examiner* — Kevin M Nguyen
(74) *Attorney, Agent, or Firm* — Ray Quinney & Nebeker P.C.; John O. Carpenter

(57) ABSTRACT

A method for improving user interaction with a virtual environment includes measuring a first position of the user's gaze relative to a virtual element, selecting the virtual element in the virtual environment at an origin when the user's gaze overlaps the virtual element, measuring a second position of a user's gaze relative to the virtual element, presenting a visual placeholder at a second position of the user's gaze when the second position of the user's gaze is beyond a threshold distance from the origin, and moving the visual placeholder relative to a destination using a secondary input device.

12 Claims, 6 Drawing Sheets

(56) References Cited

U.S. PATENT DOCUMENTS

2019/0361521 A1    11/2019    Stellmach et al.

OTHER PUBLICATIONS

"Non-Final Office Action Issued in U.S. Appl. No. 15/986,529", dated Nov. 6, 2019, 19 Pages.
"International Search Report and Written Opinion Issued in PCT Patent Application No. PCT/US2019/027411", dated Oct. 16, 2019, 18 Pages.
"Final Office Action Issued in U.S. Appl. No. 15/986,529", dated Apr. 17, 2020, 21 Pages.

* cited by examiner

SYSTEMS AND METHODS FOR GAZE-INFORMED TARGET MANIPULATION

BACKGROUND

Background and Relevant Art

With emerging ubiquitous user interfaces (UI), such as smart devices and innovative head-mounted display technology, usage of such UIs becomes more common among non-specialists. Interaction with the UIs may be improved by making the interaction more intuitive and subtle. A well-established input paradigm is point-and-click or in more general terms: point-and-command. In emerging natural UIs, a command could for instance be triggered by different voice commands, hand gestures, or touch input.

An effortless and subtle way to indicate a user's context is to take advantage of gaze tracking data to infer a user's current reference frame. Several problems arise with this approach though, as eye tracking and additional commands are asynchronous (i.e., the eye gaze is usually preceding manual inputs and may have moved on to new targets upon finishing recognition of the manual input). In addition, due to technological constraints of the tracking system as well as physiological constraints of the human visual system, the computed gaze signal may be jittery and show offsets compared to the actual eye gaze. This increases the problem of reliably referring to small and closely positioned targets. Thus, an overall problem arises about how such multimodal inputs can be appropriately combined.

BRIEF SUMMARY

In some embodiments, a method for improving user interaction with a virtual environment includes measuring a first position of the user's gaze relative to a virtual element, selecting the virtual element in the virtual environment at an origin when the user's gaze overlaps the virtual element, measuring a second position of a user's gaze relative to the virtual element, presenting a visual placeholder at a second position of the user's gaze when the second position of the user's gaze is beyond a threshold distance from the origin, and moving the visual placeholder relative to a destination using a secondary input device.

In other embodiments, a method for improving user interaction with a virtual environment includes measuring a first position of a user's gaze relative to a virtual element, selecting the virtual element in the virtual environment at an origin when the user's gaze overlaps the virtual element, receiving an input from a secondary input device, changing at least one dimension of the virtual element in response to the input from the secondary input device, and finalizing the at least one dimension upon deselecting the virtual element.

In yet other embodiments, a system for presenting visual information to a user includes a head-mounted display. The head-mounted display includes a display device, a gaze-tracking device, a processor, and a hardware storage device in data communication. The hardware storage device has instructions thereon that, when executed by the processor, cause the processor to measure a first position of a user's gaze relative to a virtual element, select the virtual element in the virtual environment at an origin when the user's gaze overlaps the virtual element, measure a second position of a user's gaze relative to the virtual element, present a visual placeholder at a destination based on the position of the user's gaze when the second position of the user's gaze is beyond a threshold distance from the origin, and move the visual placeholder relative to the second position of the user's gaze with a secondary input device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
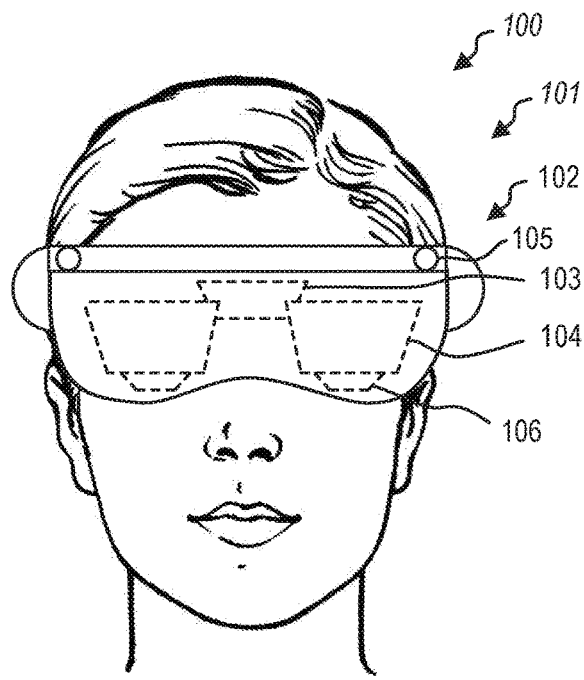
FIG. 1 is a perspective view of a head-mounted display (HMD) including a waveguide, according to at least one embodiment of the present disclosure.

This disclosure generally relates to devices, systems, and methods for visual user interaction with virtual environments. More specifically, the present disclosure relates to improving interaction with virtual elements using gaze-based selection and manipulation. In some embodiments, visual information may be provided to a user by a near-eye display. A near-eye display may be any display that is positioned near a user's eye, either to supplement a user's view of their surroundings, such as augmented or mixed reality devices, or to replace the user's view of their surroundings, such as virtual reality devices. In some embodiments, an augmented reality or mixed reality device may be a head-mounted display (HMD) that presents visual information to a user overlaid on the user's view of their surroundings. For example, the visual information from the HMD may be combined with ambient or environment light to overlay visual information, such as text or images, on a user's surroundings.

In some embodiments, the user's field of view may be at least partially encompassed by a waveguide through which the user views their surroundings. The waveguide may direct display light from a display device to the user's field of view. The waveguide may guide the display light before out-coupling the light. Upon out-coupling the light, the waveguide may combine the visual information of the display light with ambient light from the user's surroundings to deliver the visual information to the user. Overlaying the visual information from the HMD on the user's surroundings may require precise generation and positioning of the visual information relative to the user's eyes.

Visual information including virtual elements may be positioned in the user's field of view on the waveguide or other near-eye display. A gaze-tracking device of the HMD may image at least a portion of the user's eye (such as the pupil, the iris, the sclera) and identify a direction or location of the user's gaze. The direction or location of the user's gaze may then be extrapolated to a position on the near-eye display. A selection cursor may be associated with the gaze location to allow the user to highlight or select a virtual element by looking at the virtual element. In other embodiments, a gaze-tracking device may include a gyroscope, an accelerometer, a plurality of sensors to triangulate position, or other devices that allow for the measurement of the orientation and/or position of the HMD relative to the virtual environment. For example, the user's "gaze" may be a ray cast from the HMD forward from the HMD to approximate the user's gaze by approximating the user's head position and orientation as their gaze direction. In some examples, such a head-tracking "gaze" may be simpler than an eye-tracking gaze, as the user remains free to glance around in their field of view without inadvertently moving a gaze position cursor. In other examples, an eye-tracking gaze may be more intuitive as a user will naturally look at whatever object is of interest to the user during interactions with the virtual environment.

In some embodiments, gaze-informed movement and manipulation of virtual objects, either by eye-tracking gaze or by head-tracking gaze, may allow for rapid movement of virtual objects within a virtual or shared environment. In other embodiments, gaze-informed movement and manipulation of virtual object may be employed in combination with manual, voice, peripheral, or other inputs to provide different scales of movement and manipulation for both speed and precision.

FIG. 1 is a perspective view of a user 100 wearing a HMD 101. In some embodiments, the HMD 101 may have a housing 102 that contains one or more processors, storage devices, power supplies, audio devices, display devices, cameras, communication devices, or combinations thereof, that receive, collect, store, process, or calculate information that is provided to the user. For example, a display device 103 may be positioned optically adjacent a waveguide(s) or other near eye display 104 to provide visual information to the near eye display 104, which may, in turn, be presented in the user's field of view by the near eye display 104.

In some embodiments, the HMD 101 may have a near eye display 104 positioned near the user 100 to direct visual information to the user 100. The HMD 101 may include a single near eye display 104, a separate near eye display 104 for each of the user's eyes (i.e., two near eye displays 104), or more than two near eye displays 104 to provide visual information over a larger field of view.

In some embodiments, the HMD 101 may include one or more cameras 105 that may image the user's physical environment. For example, the camera(s) 105 may be visible light camera(s) 105 that may image the surrounding environment. A processor may perform image recognition routines on the visible light image to detect and recognize elements in the surrounding environment. In other examples, the camera(s) 105 may be depth sensing camera(s) that may create a depth image of the surrounding environment. For example, the camera 105 may be a time-of-flight camera, a structured light camera, stereo cameras, or other cameras that may use visible, infrared, ultraviolet, or other wavelengths of light to collect three-dimensional information about the surrounding environment. In at least one example, the camera(s) 105 may be gesture recognition cameras that allow the HMD 101 to recognize and interpret hand gestures performed by the user 100 in front of the HMD 101.

In some embodiments, the HMD 101 may further include a gaze-tracking device 106 positioned in the HMD 101 to track a direction of the user's gaze. The gaze-tracking device 106 may include a camera or a plurality of cameras to image the user's eyes. In other words, the gaze-tracking device 106 may image the user's pupil, iris, sclera, other portions of the user's eye, or combinations thereof to calculate the direction the user is looking. In some embodiments, the gaze-tracking device 106 may measure and/or calculate the x- and y-components of the user's gaze. In other embodiments, the gaze-tracking device 106 may include a gyroscope, an accelerometer, a plurality of sensors to triangulate position, or other devices that allow for the measurement of the orientation and/or position of the HMD relative to the virtual environment. For example, the user's "gaze" may be a ray cast from the HMD forward from the HMD to approximate the user's gaze by approximating the user's head position and orientation as their gaze direction.

Figure 2:
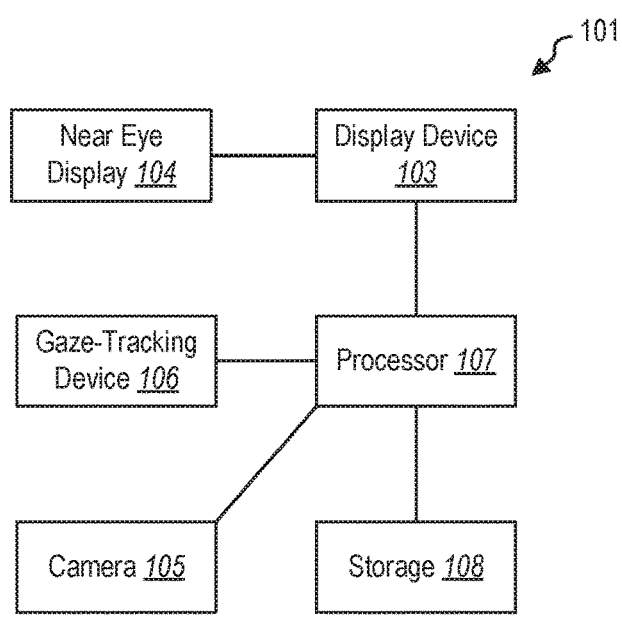
FIG. 2 is a schematic representation of the HMD of FIG. 1, according to at least one embodiment of the present disclosure.

FIG. 2 is a schematic representation of the HMD 101. The display device 103 in communication with the near eye display 104 may be in data communication with a processor 107. Similarly, the camera 105 and gaze-tracking device 106 may be in data communication with the processor 107. The processor 107 may further be in data communication with a storage device 108. The storage device 108 may be a hardware storage device, such as a platen-based storage device, a solid-state storage device, or other non-transitory or long-term storage device. The storage device 108 having instructions stored thereon to perform one or more methods or portions of a method described herein.

Figure 3:
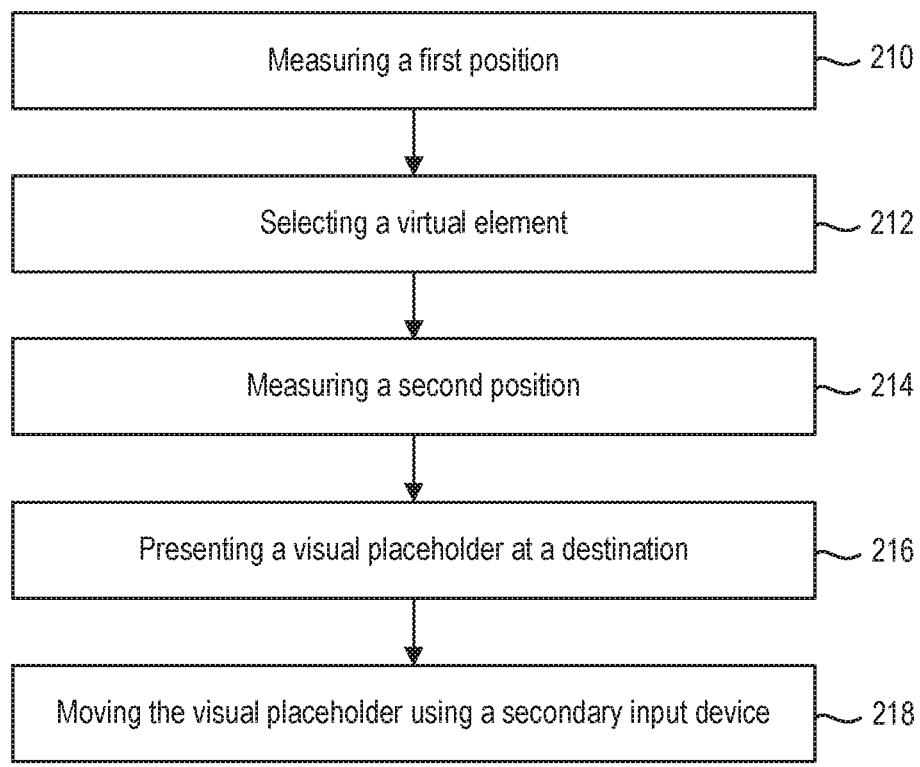
FIG. 3 is a flowchart illustrating a method of gaze-based movement of a virtual element, according to at least one embodiment of the present disclosure.

FIG. 3 is a flowchart illustrating a method of moving a virtual element within a virtual environment. The method may include measuring a first position of a user's gaze location at 210. The first position may be measured by using a gaze-tracking device described herein to measure the position of either the user's gaze based on eye-tracking or the user's gaze based on heading tracking.

In some embodiments, the first position may include x- and y-coordinates, such as when interacting with a virtual desktop with a HMD. In other embodiments, the first position may include x-, y-, and z-coordinates relative to the user, such as when interacting with virtual elements in three-dimensional space. In some embodiments, the three-dimensional space may be a virtual environment generated by the HMD or other computing device in communication with the HMD. In other embodiments, the three-dimensional space may be a shared environment. For example, a mixed reality HMD may present virtual elements in combination with a surrounding physical environment of the user. In such embodiments, the HMD may measure the surrounding physical environment of the user using, for example, the cameras on the HMD or other sensors to impart information of the surrounding physical environment into a virtual environment to create a shared environment. The HMD may then use the shared environment to position a virtual element in a virtual environment to physical element of the surrounding physical environment.

In some embodiments in a three-dimensional space, the first position may be measured by casting a ray from the HMD in the direction of a user's gaze detected by the gaze-tracking device, and first position may be the location where the ray interacts with a surface of the virtual environment or the shared environment. For example, the ray may interact with an upper surface of a virtual element, and the first position may be measured as having coordinated on the upper surface of the virtual element. In other examples, the ray may interact with a physical object, such as a surface of a table in front of a user. The first position may be measured as having coordinated on the surface of the physical table.

In other embodiments in a three-dimensional space, the first position may be measured using the focal distance of the detected gaze of each of the user's eyes. For example, the detected eye position and related gaze direction of each eye will be different based on the distance of the object at which the user is looking. The different gaze locations of each eye may allow the calculation of a focal depth of the user. Measuring the first location using focal depth of the user's gaze may allow for the first position to be located in space, and not on a (virtual or physical) surface.

The method may further include selecting a virtual element at the first position at 212. The virtual element may be selected upon receiving a selection command from an input device. The selection command may then cause the HMD to select the virtual element at the first position. In some embodiments, the input device may be a gesture recognition device, such as the camera(s), in data communication with the processor of the HMD. In other embodiments, the input device may be a voice recognition device, such as a microphone, in data communication with the processor of the HMD. In yet other embodiments, the input device may be a motion controller, such as a six degree-of-freedom (6DOF) controller, in data communication with the processor of the HMD. In yet other embodiments, the input device may be an input of a touch-sensing device, trackpad, mouse, keyboard or other conventional human interface device (HID) of a computer.

In some embodiments, the selection command and the intended gaze location at the time of the selection command may be asynchronous. For example, a user may look at a virtual element that the user intends to select. The user may begin providing a selection input (e.g., a gesture input, a mouse click, a voice input) to provide the selection command and look away to a second position, moving the gaze location, before the selection input completes and the selection command is received. This may be common among even experienced users, as conventional interactions with computer systems allow for independent movement of the user's eyes and a selection cursor.

In such embodiments, the selection command may select a virtual element the gaze location was positioned on prior to moving away. For example, measuring the first position of the gaze location may include measuring a series of first locations of the gaze location such that the system may "look back" to where the gaze location was prior to receive the selection command. In some embodiments, measuring the first position of the gaze location may include measuring and retaining in memory at least 2, 3, 4, 5, 10, 15, 20, or more gaze locations. In other embodiments, measuring the first position of the gaze location may include measuring and retaining in memory all positions of the gaze location for a buffer time, such as 5 milliseconds (ms), 10 ms, 15 ms, 20 ms, 25 ms, 50 ms, 100 ms, 500 ms, or more time. For example, upon receiving a selection command, the system may select the virtual element the user was looking at 10 ms prior to receiving the selection command. In other examples, upon receiving a selection command, the system may iterate through the gaze locations measured during the buffer time until a gaze location coincides with a virtual element.

The method further includes measuring a second position of the user's gaze at 214. The second position of the user's gaze may be measured similar to the first position. Upon measuring the second position of a user's gaze, the method may include presenting a visual placeholder at a location coinciding with the measured second position of the user's gaze. Various embodiments of the visual placeholder will be described in relation to FIGS. 6 and 7.

After presenting the visual placeholder at the second location, the method further includes moving the visual placeholder using a secondary input device at 216. In some embodiments, the secondary input device may be a gesture recognition device, such as the camera(s), in data communication with the processor of the HMD. In other embodiments, the secondary input device may be a voice recognition device, such as a microphone, in data communication with the processor of the HMD. In yet other embodiments, the secondary input device may be a motion controller, such as a six degree-of-freedom (6DOF) controller, in data communication with the processor of the HMD. In yet other embodiments, the secondary input device may be an input of a touch-sensing device, trackpad, mouse, keyboard or other conventional human interface device (HID) of a computer. In at least one embodiment, the input device and secondary input device may be the same.

The method may optionally include deselecting the virtual object with a deselection command from the input device and moving the virtual object to the destination location of the visual placeholder upon deselection.

Figure 4:
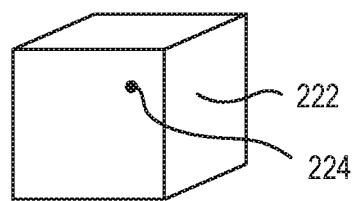
FIG. 4 is a schematic representation of a virtual environment including a virtual element; according to at least one embodiment of the present disclosure.

FIG. 4 is a schematic representation of a virtual environment 220 containing a virtual element 222 that may be presented to a user on a display, such as the waveguide of the HMD 101 of FIG. 1, a display of a MR system, a display of a VR system, a display of an AR system, or other near-eye display in communication with a processor and/or a gaze-tracking device. While the present disclosure described interaction with the virtual environment 220 through a HMD, it should be understood that in other embodiments, the virtual environment 220 may be presented on another display, such as a laptop, tablet, desktop, large format, or other display in communication with a processor and/or a gaze-tracking device. For example, the methods and systems described herein may be equally applicable to a user interacting with a large format display on a wall of a conference room. The user may move and/or manipulate virtual elements using a gaze-tracking device and other input devices in communication with the large format display. In other examples a laptop may have a front facing camera that may function as a gaze-tracking device to allow gaze-based movement and/or manipulation of virtual elements by a user interacting with the laptop.

In some embodiments, the virtual element 222 may be any element of the virtual environment that is selectable in the available software. For example, the virtual element 222 may be a window of an application presented in the virtual environment. In other examples, the virtual element 222 may be a computer assisted design (CAD) model, a menu, a scroll bar, or another movable element of the virtual environment 220 or user interface. In yet other examples, the virtual element 222 may be a virtual representation of a physical element of the physical environment around a user.

The user may interact with the virtual element 222 and/or the virtual environment 220 by positioning their gaze at the virtual element 222 or other portion of the virtual environment 220. The gaze-tracking system in data communication with the processor of the HMD may measure a gaze location 224 at a first location on the virtual element 222.

Figure 5:
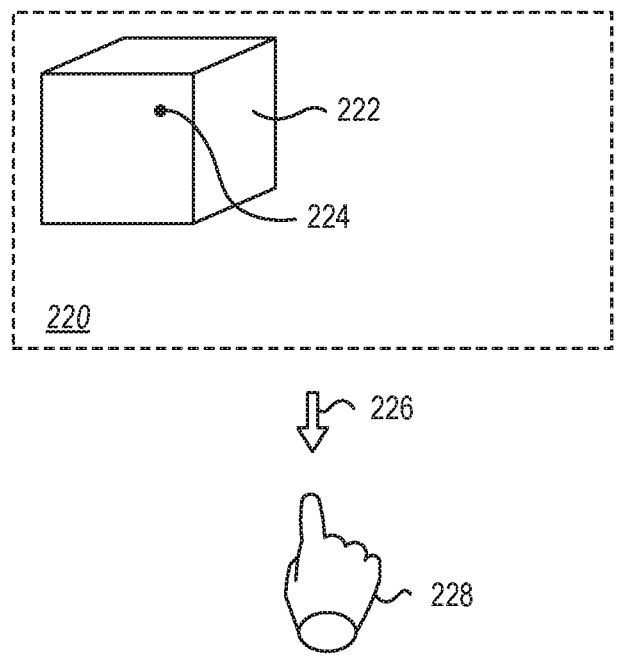
FIG. 5 is a schematic representation of a user's hand providing a selection command to select the virtual element of FIG. 4, according to at least one embodiment of the present disclosure.

Referring now to FIG. 5, the virtual element 222 may be selected while the gaze location 224 is positioned on the virtual element 222 by providing a selection command 226 with an input device 228. In the depicted embodiment, the selection command 226 may be a downward "click" of a user's finger and the input device 228 may be gesture recognition device that recognizes the click of the user's finger or other hand gesture. In FIG. 5, the gesture recognition device is schematically represented outside of the virtual environment 220 by the user's hand and gesture itself. In some embodiments, the gesture recognition device may be the camera described in relation to FIG. 1. In other embodiments, the gesture recognition device may be camera not connected to the housing of the HMD. In yet other embodiments, the gesture recognition device may be a glove or other wearable electronic device that senses the movement and position of the hand and parts of the hand.

Figure 6:
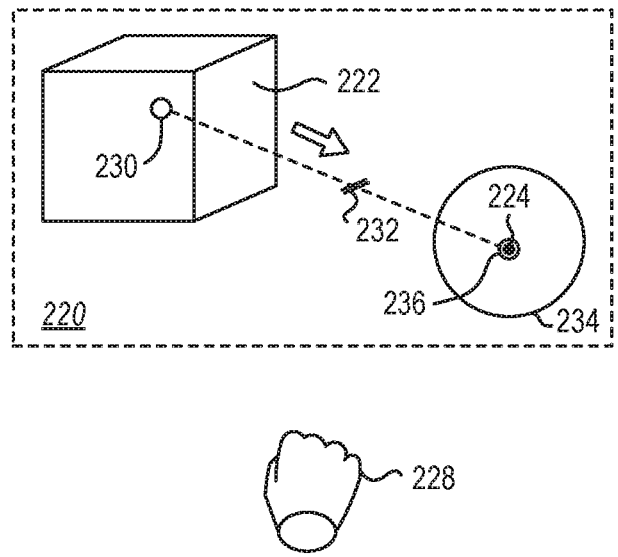
FIG. 6 is a schematic representation of a user's gaze moving a visual placeholder, according to at least one embodiment of the present disclosure.

FIG. 6 shows the input device 228 continuing to hold the selection command by keeping the finger of the hand in the downward position until the virtual element 222 is deselected by ceasing the selection command. In other examples, the selection command may toggle the selection of the virtual element 222, and the selection command may be input once with the virtual element 222 remaining selected until a subsequent deselection command is received.

The gaze location 224 may move away from an origin 230 (e.g., a geometric or volumetric center of the virtual element 222) past a threshold 232 to prompt the presentation of a visual placeholder 234. In some embodiments, the threshold 232 may be an angular displacement relative to the user's viewpoint. For example, a rotation of the gaze location 224 relative to the user of more than 2° may prompt the presentation of a visual placeholder 234. In other examples, a rotation of the gaze location 224 relative to the user of more than 4° may prompt the presentation of a visual placeholder 234. In yet other examples, a rotation of the gaze location 224 relative to the user of more than 6° may prompt the presentation of a visual placeholder 234. In other embodiments, the threshold 232 may be a translational distance relative the three-dimensional space of the virtual environment 220. For example, translating the virtual element 1.0 meter backward on a tabletop relative to a first position 230 may require less angular displacement of the gaze location 224 (i.e., movement of the user's eyes or head) than translating the virtual image 1.0 meter to the right of the first position 230. However, the nominal distance moved may be the same.

Therefore, in some instances it may be more efficient for the threshold 232 to be relative to the translational distance of the gaze location 224 in the virtual environment 220. In some embodiments, the threshold 232 may be in a range having an upper value, a lower value, or upper and lower values including any of 1 centimeter (cm), 2 cm, 5 cm, 10 cm, 15 cm, 20 cm, 25 cm, 30 cm, or any values therebetween. For example, the threshold 232 may be greater than 1 cm. In other examples, the threshold 232 may be less than 30 cm. In yet other examples, the threshold 232 may be between 1 cm and 30 cm. In further examples, the threshold 232 may be between 5 cm and 20 cm.

In other embodiments, the threshold 232 may be relative to the size of the virtual element 222 selected. For example, the threshold 232 may be a nominal distance that is 50% of the largest dimension of the virtual element 222. In other words, the gaze location 224 may exceed the threshold 232 when the gaze location 224 is "outside" of the virtual element 222. In other examples, the threshold 232 may be a nominal distance that is 100% of the largest dimension of the virtual element 222. In yet other examples, threshold 232 may be a nominal distance that is 200% of the largest dimension of the virtual element 222.

Once the gaze location is beyond the threshold 232, a visual placeholder 234 may be presented to the user in the virtual environment 220 centered on the gaze location 224. The user may move the gaze location 224 to a desired destination, such as the second location 236 of the gaze location 224 and the visual placeholder may follow the gaze location 224. By following the gaze location 224, the visual placeholder 234 may allow a user to rapidly and intuitively place the visual placeholder 234 at or near a desired destination.

In some embodiments, the visual placeholder 234 may be a standard placeholder irrespective of the virtual element 222. For example, the visual placeholder 234 may be a sphere. In other examples, the visual placeholder 234 may be a cube. In yet other examples, the visual placeholder 234 may be any three-dimensional solid. In further examples, the visual placeholder 234 may be any two-dimensional image. In at least one example, the visual placeholder 234 may be an "X" presented on a surface of another virtual or physical element. In other embodiments, the visual placeholder 234 may be a copy of the virtual element 222. For example, the visual placeholder 234 may be a "ghost" or partially transparent copy of the virtual element 222. In yet other embodiments, the visual placeholder 234 may be a duplicate of the virtual element 222, retaining any shape, size, opacity, textures, or other properties.

Figure 7:
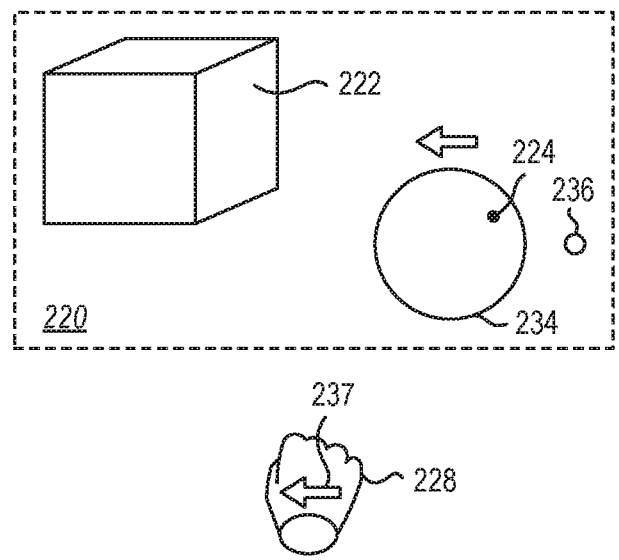
FIG. 7 is a schematic representation of a user's hand providing a movement command to precisely move the virtual element of FIG. 4, according to at least one embodiment of the present disclosure.

FIG. 7 illustrates fine adjustment of the position of the visual placeholder 234 in the virtual environment 220. In some embodiments, gaze-tracking may be imprecise, such that gaze-based movement and positioning of a virtual element 222 may be performed coarsely and rapidly with gaze-tracking while precision placement may be performed subsequent to the gaze-based movement. The precision placement may be performed by moving the visual placeholder 234 with a secondary input device. In some embodiments, the secondary input device may be the input device 228 used to select the virtual element 222. In other embodiments, the secondary input device may be a different input device from the input device 228 used to select the virtual element 222.

As described herein, the secondary input device may be a gesture recognition device in data communication with the processor of the HMD. In other embodiments, the secondary input device may be a voice recognition device, such as a microphone, in data communication with the processor of the HMD. In yet other embodiments, the secondary input device may be a motion controller, such as a 6DOF controller, in data communication with the processor of the HMD. In yet other embodiments, the secondary input device may be an input of a touch-sensing device, trackpad, mouse, keyboard or other conventional human interface device (HID) of a computer.

FIG. 7 shows a movement input 237 from the secondary input device (which, in the depicted embodiment is the same as the input device 228). The movement input 237 may cause the visual placeholder to decouple from the gaze location 224 and move relative to the gaze location 224 and the second location 236. For example, a user may want to move a candlestick from a first end of a table in the virtual environment to a second end of the table. The user may select the virtual element (the candlestick) with a downward click of the user's finger (recognized by a gesture recognition device) and then look at the second end of the table to present a visual placeholder at a far end of a table. The visual placeholder may follow the gaze location until the use begins moving their hand relative to the gesture recognition device, at which point the visual placeholder may decouple from the gaze location, allowing the user to look away from the visual placeholder without disturbing the position of the visual placeholder. For example, the user may look back to the candlestick still at the first end of the table and verify the placement of the candlestick relative to other elements on the table and then look back to the second end of the table with the visual placeholder to precisely place the visual placeholder relative to similar elements at the second end of the table.

Figure 8:
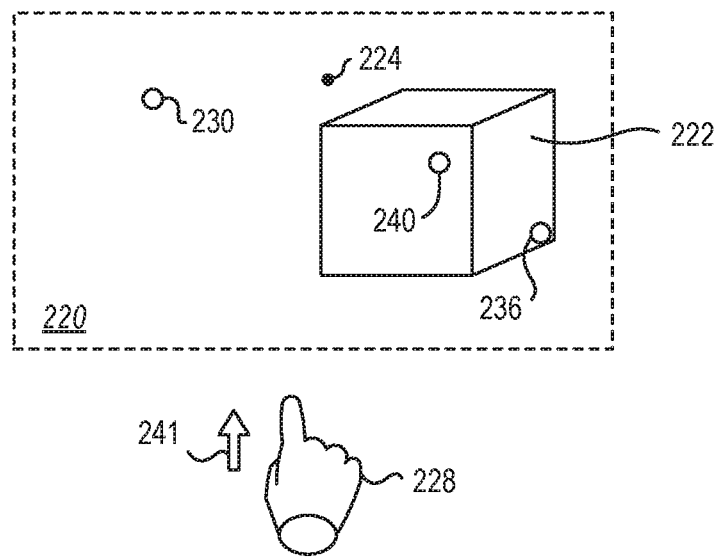
FIG. 8 is a schematic representation of a user's hand providing a deselection command to deselect the virtual element of FIG. 4, according to at least one embodiment of the present disclosure.

FIG. 8 schematically illustrates moving the virtual element 222 within the virtual environment 220 from first position 230 to the destination 240. A deselection command 241, such as an "unclick" gesture from the input device 228 may deselect the virtual element 222. Upon deselecting the virtual element 222, the virtual element may move to and replace the visual placeholder at the destination 240. It should be understood that the destination 240 may be different from the second location 236 and/or the gaze location 224.

Figure 9:
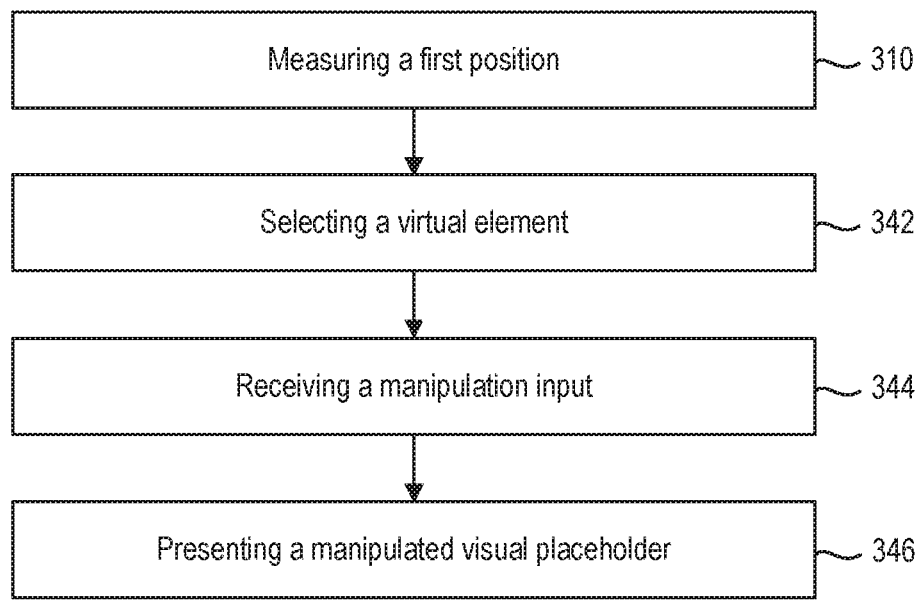
FIG. 9 is a flowchart illustrating a method of gaze-based movement of a virtual element, according to at least one embodiment of the present disclosure.

A similar method of gaze-informed interaction with a virtual element may include resizing or scaling of a virtual element. FIG. 9 through FIG. 12 depict an example of resizing a virtual element using a gaze location to select the virtual element. FIG. 9 is a flowchart of a method of manipulating a virtual element. The method may include measuring a first position of a user's gaze location at 310. The first position may be measured by using a gaze-tracking device described herein to measure the position of either the user's gaze based on eye-tracking or the user's gaze based on heading tracking. Measuring the first position of the user's gaze location may be similar to measuring the first position in the method described in relation to FIG. 3.

The method may further include selecting a virtual element at 342. In some embodiments, selecting the virtual element may be similar to selecting the virtual element in the method as described in relation FIG. 3. In other embodiments, selecting the virtual element may include provided at least two selection commands simultaneously. Providing at least two selection commands may provide two input devices, the relative motion or relative inputs of which may provide the manipulation input to manipulate the virtual element. For example, the manipulation input may be provided by a multi-touch touch-sensing device. In such embodiments, the selection inputs may be at least two inputs simultaneously on the multi-touch touch-sensing device. Moving the two inputs relative to one another, such as moving the inputs together or moving the inputs apart, may resize the virtual element. In other examples, moving the two inputs in an arc around a mutual centerpoint may rotate the virtual element.

The method further includes receiving the manipulation input at 344 and presenting a manipulated visual placeholder at 346. In some embodiments, the manipulation input may be received from a gesture recognition device, such as the camera(s), in data communication with the processor of the HMD. In other embodiments, the manipulation input may be received from a voice recognition device, such as a microphone, in data communication with the processor of the HMD. In yet other embodiments, the manipulation input may be received from a motion controller, such as a six degree-of-freedom (6DOF) controller, in data communication with the processor of the HMD. In yet other embodiments, the manipulation input may be received from a touch-sensing device, trackpad, mouse, keyboard or other conventional human interface device (HID) of a computer.

In some embodiments, the visual placeholder may be a copy of the virtual element, such as a ghost of the virtual element. In other embodiments, the visual placeholder may be a sphere, a cube, a pyramid, or other three-dimensional solid to reflect the dimensional changes during resizing and/or rotating. In some examples, a three-dimensional solid may be rotationally symmetrical and object axes may be included in the visual placeholder to assist the user in identifying the manipulations applied to the visual placeholder before deselecting and confirming any changes to the virtual element.

Figure 10:
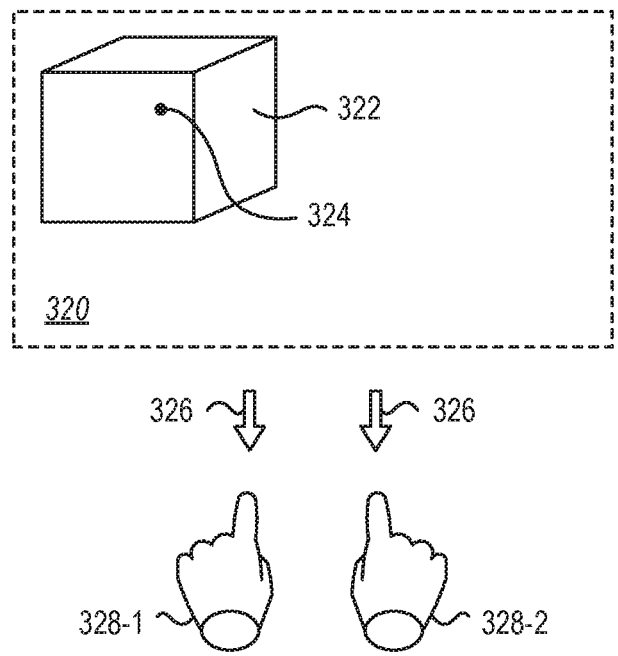
FIG. 10 is a schematic representation of a user's hands providing a selection command to select a virtual element, according to at least one embodiment of the present disclosure.

FIG. 10 is a schematic representation of a virtual environment 320 with a virtual element 322 and a gaze location 324 of a user's gaze. The virtual element 322 may be selected by a selection command 326 from an input device. In some embodiments, the input device may be a plurality of input devices 328-1, 328-2 that may allow for a greater range of commands in the three-dimensional space. For example, a first input device 328-1 may be a user's left hand and a second input device 328-2 may be a user's right hand. While a "click" of one hand may provide a selection command to allow subsequent movement of the visual placeholder using the user's hand, as described in relation FIG. 5 through FIG. 7, a "click" of two hands simultaneously may provide a selection command and tracking of both hands to allow subsequent movement and/or manipulation of the visual placeholder or virtual element 322. In other examples, the manipulation command may be received from a single input device, such as from a 6DOF peripheral having a scroll wheel, thumb stick, or other directional or rotary input mechanism.

Figure 11:
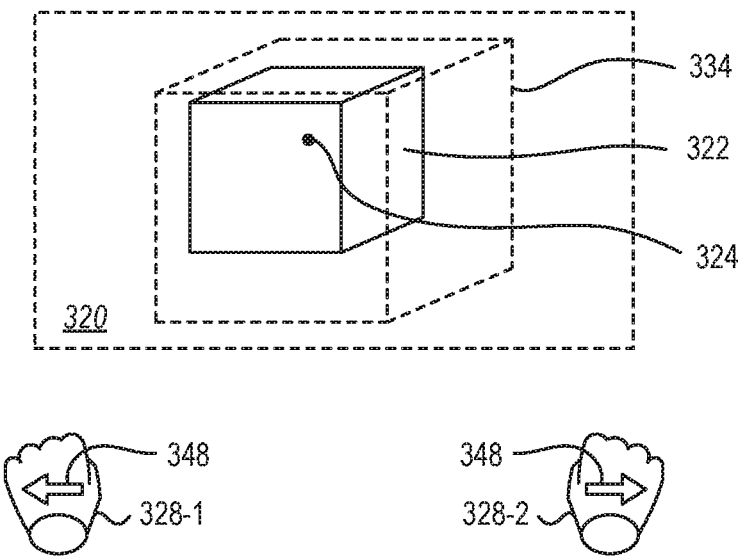
FIG. 11 is a schematic representation of a user's hands providing a manipulation command to manipulate the virtual element of FIG. 10, according to at least one embodiment of the present disclosure.

FIG. 11 illustrates an example of a visual placeholder 334 being manipulated by a manipulation command 348 from the first input device 328-1 and the second input device 328-2 while remaining at or near a gaze location 324. In some embodiments, the selected virtual element 322 may remain stationary and/or static while a visual placeholder 334 is manipulated relative to the virtual element 322 for comparison. For example, scaling or rotating the virtual element 322 may be represented by visualizing the relative scaling or rotating of the visual placeholder 334 relative to the "original" virtual element 322. In other embodiments, the virtual element 322 may be scaled or rotated dynamically and/or in real time, such that a user may visualize the effects of the manipulation as the manipulation input 348 is received by the system.

As described herein, in some embodiments, the visual placeholder 334 may be a standard placeholder irrespective of the virtual element 322. For example, the visual placeholder 334 may be a sphere. In other examples, the visual placeholder 334 may be a cube. In yet other examples, the visual placeholder 334 may be any three-dimensional solid. In other embodiments, the visual placeholder 334 may be a copy of the virtual element 322. For example, the visual placeholder 334 may be a "ghost" or partially transparent copy of the virtual element 322. In yet other embodiments, the visual placeholder 334 may be a duplicate of the virtual element 322, retaining any shape, size, opacity, textures, or other properties. In some examples, a three-dimensional solid may be rotationally symmetrical and object axes may be included in the visual placeholder to assist the user in identifying the manipulations applied to the visual placeholder before deselecting and confirming any changes to the virtual element.

Figure 12:
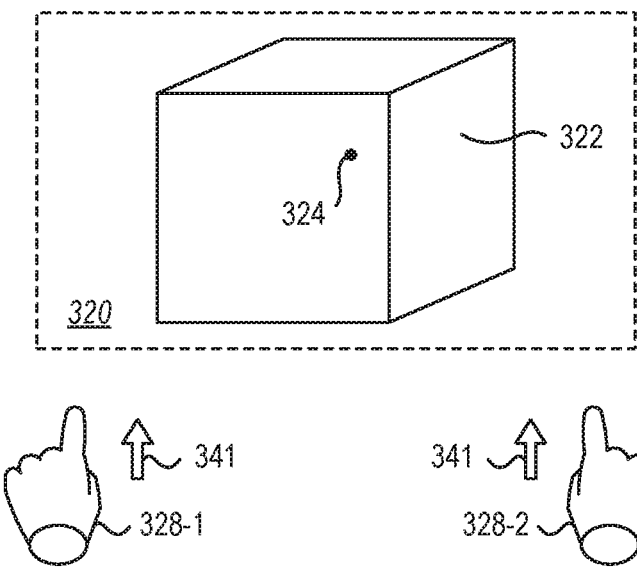
FIG. 12 is a is a schematic representation of a user's hand providing a deselection command to deselect the virtual element of FIG. 10, according to at least one embodiment of the present disclosure.

FIG. 12 illustrates the virtual environment 320 with the virtual element 322 of FIG. 10 and FIG. 11 resized according to the manipulation input 348 of FIG. 11. A deselection command 341 may be received from the input device(s) 328-1, 328-2 to deselect the virtual element 322. The virtual element 322 may then be resized, rotated, or otherwise manipulated as represented by the visual placeholder upon the deselection command 341 being received.

While movement and resizing of virtual elements 322 are described individually, it should be understood that a user may move a virtual element 322 by moving the gaze location 324 beyond a threshold, as described in relation to FIG. 3 through FIG. 8, and simultaneously and/or subsequently resize, rotate, or otherwise manipulate the virtual element 322 and/or visual placeholder 334, as described in relation to FIG. 9 through FIG. 12. For example, a user may provide a selection command 326 via hand gestures with two hands, as described in relation to FIG. 10. The user may then move the gaze location 324 beyond a threshold to prompt the presentation of a visual placeholder 334 at a second location, as described in relation to FIG. 6. The user may subsequently move the visual placeholder by moving both hands relative to the gesture recognition device to provide a movement command 237, as described in relation to FIG. 7, and may move both hands relative to one another to provide a manipulation command 348 as described in relation to FIG. 11. Upon deselecting the virtual element 322, such as described in relation to FIG. 12, the virtual element 322 may move to a destination 240, as described in relation to FIG. 8, and may be resized, rotated, or otherwise manipulated as represented by the visual placeholder upon the deselection command 341 being received, as described in relation to FIG. 12.

Further, it should be understood that input device and secondary input devices may be used in any combination. For example, a selection command may be provided by a HID, such as a mouse, keyboard, trackpad, trackball, or other convention HID, while a movement command may be provided by a touch-sensing device, such as a multi-touch device, and a manipulation command may be provided by a voice recognition device (e.g., recognizing a user speaking "shrink" or "rotate 180°"). In other examples, a selection command may be provided by a voice recognition device (e.g., recognizing a user speaking "select"), while a movement command may be provided by a 6DOF peripheral. In yet other examples, a selection command may be provided by a motion controller (e.g., via a button on the motion controller), and a manipulation command may be provided by a multi-touch touch-sensing device. In further examples, a gesture recognition device may provide a selection command, a movement command, and a manipulation command (e.g., tracking the rotation of a user's hand); while a voice recognition device may provide a second manipulation command (e.g., recognizing a user speaking "scale up 100%").

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for improving user interaction with a virtual environment, the method comprising:
   measuring a first position of a user's gaze relative to a virtual element;
   selecting the virtual element in the virtual environment at an origin when the user's gaze overlaps the virtual element;
   measuring a second position of a user's gaze relative to the virtual element;
   presenting a visual placeholder at a destination based on a second position of the user's gaze when the second position of the user's gaze is beyond a threshold distance from the origin; and
   moving the visual placeholder relative to the destination using a secondary input device.

2. The method of claim 1, measuring a first position of the user's gaze including using a head-mounted display.

3. The method of claim 1, the visual placeholder being a copy of the virtual element.

4. The method of claim 1, moving the visual placeholder including recognizing a gesture input from a user.

5. The method of claim 1, the threshold distance being at least 1°.

6. The method of claim 1, selecting a virtual element including recognizing a gesture input from a user.

7. The method of claim 1, further comprising moving the virtual element to the visual placeholder upon deselecting the virtual element.

8. The method of claim 1, further comprising fixing the destination after beginning moving the visual placeholder relative to the second position of the user's gaze with a secondary input device.

9. A system for presenting visual information to a user, the system comprising:
   a head-mounted display, the head-mounted display including:
   a display device,
   a gaze-tracking device,
   a processor in data communication with the display device and the gaze-tracking device, and
   a hardware storage device in data communication with the processor, the hardware storage device having instructions thereon that, when executed by the processor, cause the processor to:
      measure a first position of a user's gaze relative to a virtual element,
      select the virtual element in the virtual environment at an origin when the user's gaze overlaps the virtual element,
      measure a second position of a user's gaze relative to the virtual element,
      present a visual placeholder at a destination based on the second position of the user's gaze when the second position of the user's gaze is beyond a threshold distance from the origin, and
      move the visual placeholder relative to the destination with a secondary input device.

10. The system of claim 9, wherein the user's gaze includes a focal depth.

11. The system of claim 9, further comprising a waveguide in communication with the display device, where the virtual element is presented on the waveguide.

12. The system of claim 9, the gaze-tracking device including a plurality of cameras to track a user's eyes.

* * * * *